(No Model.)

F. C. GERSTENBERG.
PLUMBER'S TRAP.

No. 340,777. Patented Apr. 27, 1886.

WITNESSES:
C. Neveux
E. Sedgwick

INVENTOR:
F. C. Gerstenberg
BY Munn & Co
ATTORNEYS.

UNITED STATES PATENT OFFICE.

FREDERICK C. GERSTENBERG, OF ASTORIA, NEW YORK.

PLUMBER'S TRAP.

SPECIFICATION forming part of Letters Patent No. 340,777, dated April 27, 1886.

Application filed February 2, 1886. Serial No. 190,623. (No model.)

*To all whom it may concern:*

Be it known that I, FREDERICK C. GERSTENBERG, of Astoria, in the county of Queens and State of New York, have invented certain new and useful Improvements in Plumbers' Traps, of which the following is a full, clear, and exact description.

The invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1:
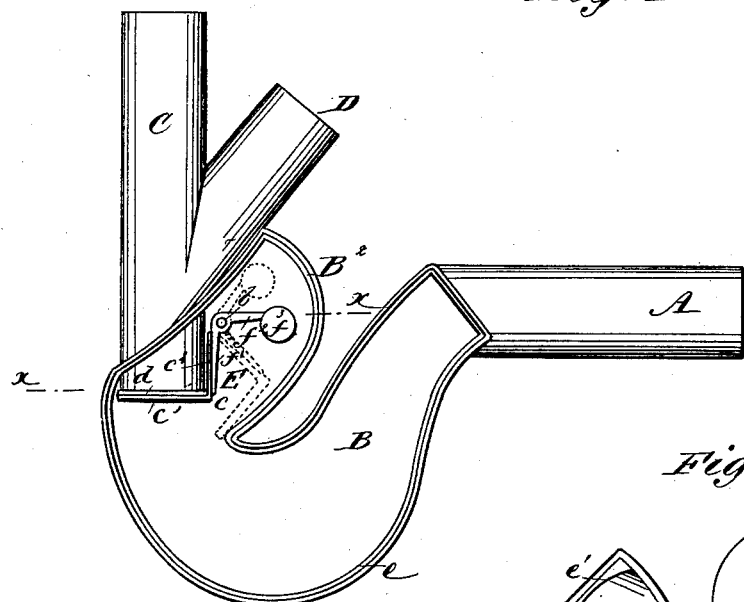
Figure 2:
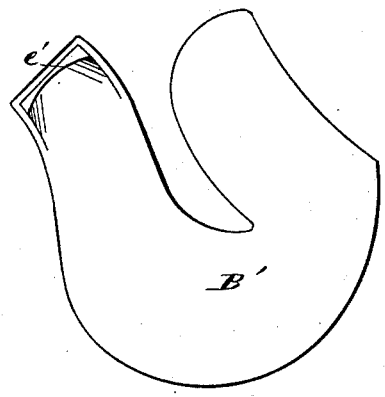
Figure 3:
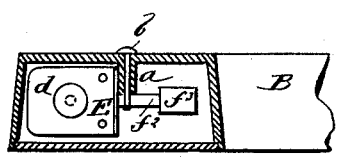
Figure 4:
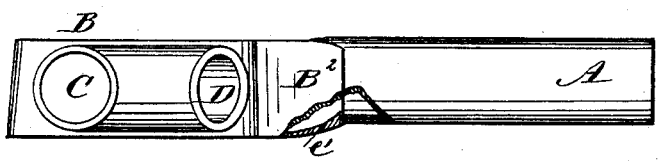
Figure 5:
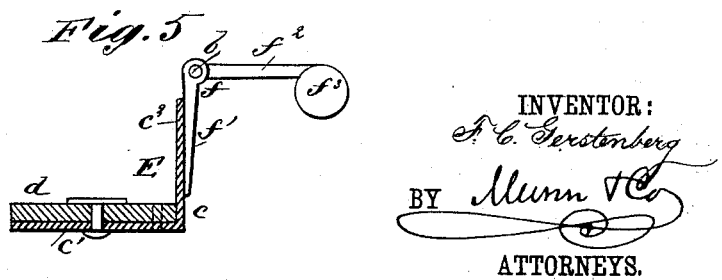

Figure 1 is a side elevation of my new and improved plumber's trap, the side plate being removed. Fig. 2 shows an inside view of the side plate. Fig. 3 is a sectional plan view taken on the line $xx$ of Fig. 1. Fig. 4 is a broken plan view of the trap, and Fig. 5 is an enlarged sectional elevation of the weighted valve removed from the trap.

A represents the waste-pipe; B, the D-trap; C, the main outlet-pipe; D, the branch overflow-pipe, and E represents the valve for closing the lower end of the outlet-pipe C, which enters the trap B a short distance, as shown in Fig. 1. One side of the trap B is closed by a side plate, B', which may be removed for clearing the trap or repairing the valve. The upper part of the trap B, where it connects with the waste-pipe A, is on a higher level than the lower end of the outlet-pipe C, so the pipe C will always be water-sealed. The trap B is formed with the upper chamber, $B^2$, for inclosing the valve E, and one side of this chamber $B^2$ is formed or provided with the inwardly-projecting stud $a$, which is hollow to receive the pin $b$, on which the valve is pivoted.

The valve proper is composed of the plate $c$, bent at right angles, and the packing $d$, of leather or other soft material, secured upon the upper surface of the lower portion, $c'$, of the plate $c$ to form a tight joint with the lower end of the pipe C when the valve is closed. The upper portion, $c^2$, of the plate $c$ is connected to the lower member, $f'$, the bell-crank $f$, through the angle of which the pivot-pin $b$ passes. The member $f^2$ of the said bell-crank $f$ is provided with a weight, $f^3$, which slightly overbalances the lower portion of the valve, so it will close the valve against the pipe when there is little or no pressure of water in the pipe C. When the valve is closed, any gas that may find its way through the water retained in the D-trap B will be stopped by the valve and prevented from entering pipe C, and if there is any considerable pressure of gas it will tend to close the valve more firmly against the pipe C.

In order to form a gas-tight joint between the trap B and side plate, B', I form the former with a rabbet, $e$, to receive the plate, and I form the plate with the inwardly-projecting lip $e'$ at one end, as shown clearly in Fig. 2. The lip $e'$ is for the purpose of strengthening the plate B'. This plate B' is secured within the rabbet $e$ by soldering or brazing it to the part B.

Having thus described my invention, what I claim as new, and desire to secure by Letters Patent, is—

A plumber's trap consisting of the D-trap B, open at one side, formed with a rabbet around the edge of its open side, the recess $B^2$, and the projection $a$ within said recessed part, the vertical pipe C, extending into the trap at the recessed end $B^2$, the horizontal valve $c$, the weighted bell-crank lever $f$, pivoted on the stud $a$, the outlet A, leading from the trap at a point above the lower end of the pipe C, and the cover-plate B', fitting within the rabbeted edges of the trap B, substantially as set forth.

FREDERICK C. GERSTENBERG.

Witnesses:
 H. A. WEST,
 EDGAR TATE.